(12) United States Patent
Marihugh et al.

(10) Patent No.: US 6,677,689 B2
(45) Date of Patent: Jan. 13, 2004

(54) STORE FIXTURE POWER DISTRIBUTION SYSTEM

(75) Inventors: Daniel W. Marihugh, Chicago, IL (US); Goran Simic, Lombard, IL (US)

(73) Assignee: Sears Brands, LLC, Hoffman Estates, IL (US)

( * ) Notice: Subject to any disclaimer, the term of this patent is extended or adjusted under 35 U.S.C. 154(b) by 286 days.

(21) Appl. No.: 09/833,329

(22) Filed: Apr. 12, 2001

(65) Prior Publication Data

US 2002/0149269 A1 Oct. 17, 2002

(51) Int. Cl.[7] .................................................. H02G 1/00
(52) U.S. Cl. ........................................................ 307/147
(58) Field of Search .................... 307/147; 439/535, 439/652; 174/40 R, 75 R

(56) References Cited

U.S. PATENT DOCUMENTS 4,812,958 A * 3/1989 Rolfe et al. .................. 362/431
6,571,519 B1 * 6/2003 Diffrient et al. .............. 52/239

* cited by examiner

Primary Examiner—Gregory J. Toatley, Jr.
(74) Attorney, Agent, or Firm—Michael Best & Friedrich LLP

(57) ABSTRACT

A modular electrical power and/or signal distribution system for store product displays can include a plurality of product display fixtures each defining at least one product display surface. An electrical distribution grid can be provided above the plurality of display fixtures within the store. The electrical distribution grid can have a plurality of spaced apart junction boxes each linked at least to a power source. A riser can be removably coupled to part of the fixture. The riser can have a lower box section with at least one power receptacle and an upper conduit section with a power cable extending from the conduit section. The power cable can have a power plug adapted for electrical connection with a selected one of the junction boxes and for electrically coupling the at least one power receptacle to the distribution grid. The system can also provide various signal connections for different products displayed, as needed. The system can be provided as separate modular components, as a single system, or as a kit including one or more risers, cable connections, and cable mask and support grids attachable near the store ceiling.

41 Claims, 9 Drawing Sheets

STORE FIXTURE POWER DISTRIBUTION SYSTEM

FIELD OF THE INVENTION

The invention is generally related to store fixtures, and more particularly to a distribution system and method of distributing electrical power and/or signals to store fixtures.

BACKGROUND OF THE INVENTION

Virtually all retail and other stores display some type of product for sale on various fixtures and shelves. Many stores employ display fixtures that require electricity at the display to operate display lighting or to provide power for some other display feature or to provide power for operating actual product samples that are displayed. For example, electronic stores and store departments typically display a wide variety of televisions, stereo equipment, computers, electronic games, and the like that are operable by consumers. Power must thus be available at the fixture for the displayed items.

More modern technological products often require additional electronic signals in various forms such as digital, fiber optic converted, microwave, and/or other types of signals to operate. Such signals must also be available at the display fixture if the product is to be operable by a consumer at the fixture. Technology is constantly changing. Also, the sheer number of available products and options increases all the time.

Most stores, especially larger, multi-product or department stores, are constructed having a concrete slab floor. The store is typically equipped with floor mounted and routed power and signal distribution grids. These grids are typically fixed and cannot be altered once the store is built. A particular section of the store is selected and design to accommodate a number of electronic equipment and product displays. However, these store sections do not offer any flexibility to permit incorporating new technologies within the store environment. These store sections also do not easily accommodate re-arranging and altering the store environment.

It is common to alter and rearrange part or all of a store environment to accommodate new fashions, new products, simple product turn-over, seasonal items, design and style updates, consumer taste, and the like. However, the areas of the store having fixed, floor provided power and signal distribution grids cannot be easily updated, altered, or changed. Unfortunately, it is therefore common to route extension cords from the fixed junction boxes to the newly designated product display areas, as needed. This practice can result in an unwieldy tangle of wires and cable, an unsightly and perhaps unsafe store environment, and an often illegal power and signal distribution system. Alternatively, it is also common to leave as is the electronics product areas in the store, though a new or updated configuration for these areas may be desired or needed.

BRIEF DESCRIPTION OF THE DRAWINGS

Exemplary power and/or signal distribution systems and methods in accordance with the teachings of the present invention are described and explained in greater detail below with the aid of the drawing figures in which.

DETAILED DESCRIPTION OF THE PREFERRED EMBODIMENTS

The present invention discloses a store power distribution system for providing electrical power and, if needed, electronic signals of various types to products being displayed in the store. The system is adaptable to provide power and/or signals to virtually any location in the store with little time, cost and reconstruction outlay. The system is modular in design resulting in a flexible, easily adaptable product display environment.

Figure 1:
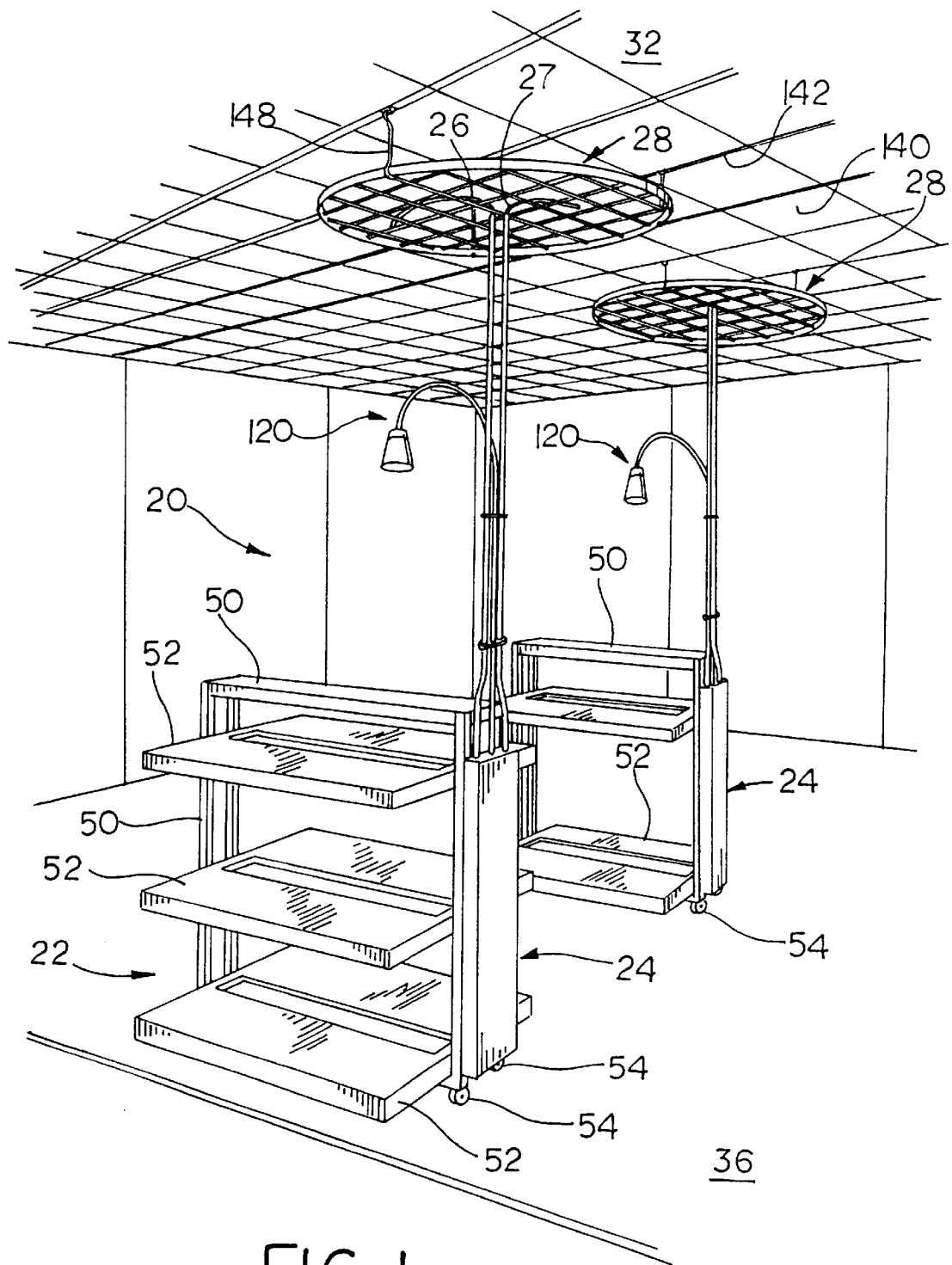
FIG. 1 is a perspective view of a store environment including a plurality of display fixtures incorporating a power and signal distribution system constructed according to the teachings of the present invention.

Referring now to the drawings, FIG. 1 illustrates a perspective view of a portion of a store environment incorporating one example of a power distribution system 20 constructed according to the teachings of the present invention. The distribution system generally has a product display fixture 22, a power distribution riser 24, at least one power cable 26 extending from the riser 24, at least one optional signal cable 27, if necessary, and a plurality of mask and cable support grids 28. The various portions of the system can be provided separately, grouped in kits, or packaged as an entire system.

Figure 2:
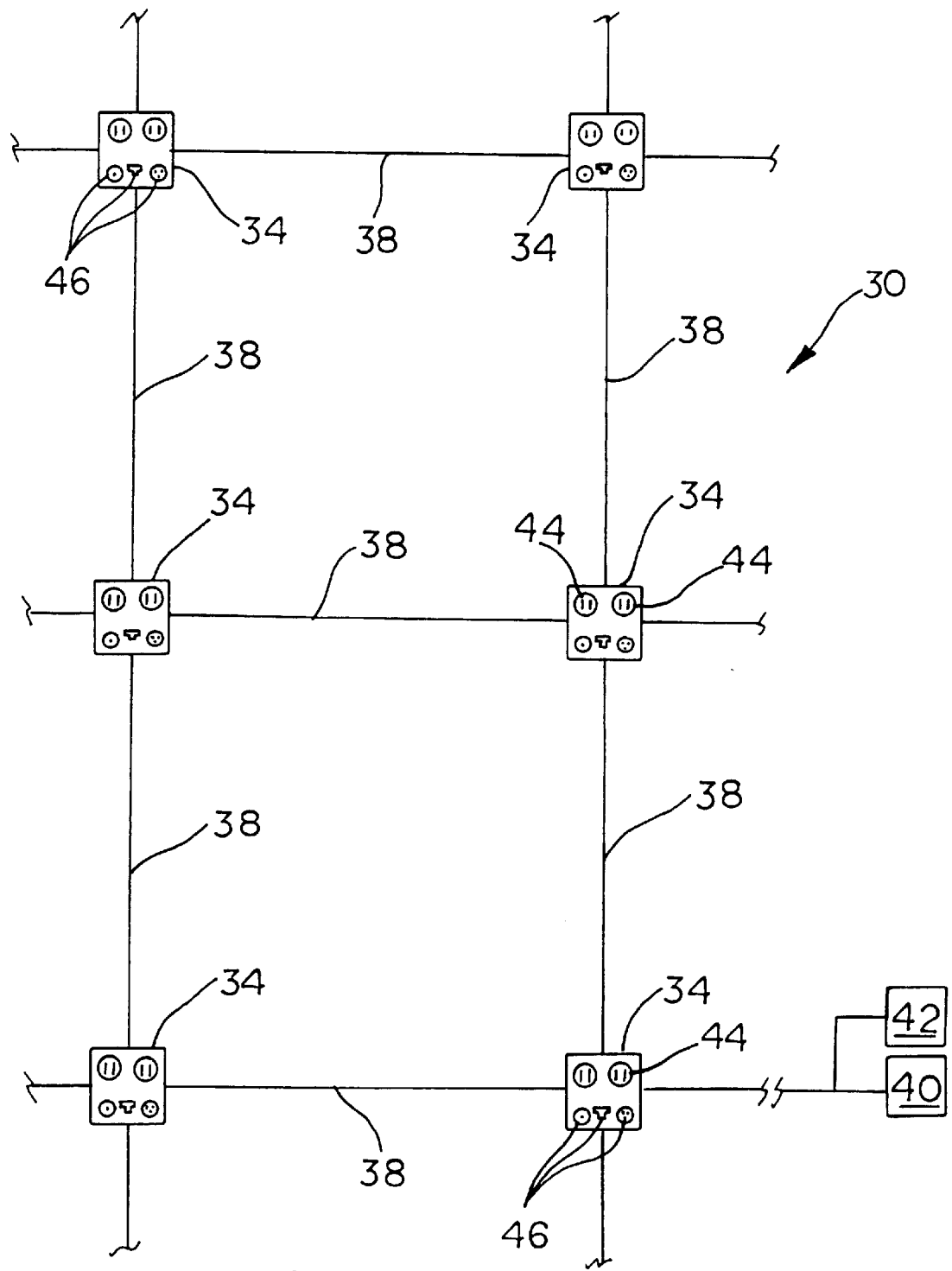
FIG. 2 is a schematic plan view of the ceiling mounted power and signal distribution grid shown in FIG. 1.

The system 20 is intended for use with a power distribution grid 30, shown schematically in FIG. 2, that is preferably provided in a ceiling 32 of the store. The distribution grid 30 can also be provided in a floor of the store. However, the floor of most stores is typically poured concrete. Once the floor is poured, the power distribution grid 30 cannot be easily altered, modified, or rearranged, if needed, without tearing up portion of the floor. A ceiling mounted grid 30 is more easily accessible and not permanently embedded in concrete. Thus, the ceiling mounted grid 30 can be modified if necessary. The power distribution grid 30 can also be provided throughout the store environment or only in portions of the store as desired.

The grid 30 has a plurality of junction boxes 34 arranged spaced apart equidistant from one another in this example. The grid spacing between the boxes 34 can vary according to the needs of a particular store. In one example, the height of the ceiling 32 from a floor 36 of the store is such that an 8 foot grid spacing is adequate. The riser 24 height, ceiling 32 height, and cable 26 and 27 length will effect the junction box 34 spacing of the distribution grid 30.

As shown schematically in FIG. 2, the junction boxes 34 are interconnected by various wires and cables 38 and to a power source 40 and various signal sources 42, as needed for a particular system. The power source 40 can be the store electrical power. The signal sources 42 can be one or more of analog or digital cable television, telephone, internet service, and the like, for example. The signal sources 42 can be many and can vary considerably according to the technology available and to the needs of a particular store product display. As shown, each junction box 34 has at least one power connection 44 and one or more signal connections 46 for connection with the power cables 26 and signal cables 27 of the riser 24.

FIG. 1 illustrates one example of a product display fixture 22 suitable for use with the disclosed system 20. The term "fixture" is used herein to denote the overall product display apparatus providing one or more surfaces adapted for supporting products for display in the store. As will be evident to those having ordinary skill in the art, the display fixture can vary considerably and yet fall within the scope of the present invention. The fixture construction, configuration, design, size, and the like can vary from that shown and described herein. The fixture can be supported on the floor, wall, or ceiling of the store. The fixture supporting structure and/or the product support surface characteristics can vary from that described below for the fixture 22.

In this example, the disclosed fixture 22 generally has a frame 50 and a plurality of shelves 52 supported by the frame. The frame 50 acts as the supporting structure for the shelves 52 and can vary in size, shape, and structural detail, if such a frame is utilized. The frame 50 in this example includes a plurality of wheels 54 that support the fixture 22 on the floor 36. The fixture 22 can therefore be easily moved as needed. The frame 50 need not be supported on wheels and can instead rest directly on the floor 36. In addition, the shelves 52 need not be supported by a frame at all. The shelves 52 can alternatively be supported on a wall within the store without the use of a frame. If so, the riser 24 can be mounted directly to a portion of a shelf 52 or to the wall near a shelf instead of being mounted to part of the frame 50 as described below for the disclosed fixture 22.

Each disclosed shelf 52 is supported by the frame 50 and has an upwardly facing product support surface 56. Electronic products such as televisions, radios, stereo equipment, DVD players, telephones, computers, and the like are typically displayed for consumers to view and test. In order to test these products, electric power and, when necessary, other electronic signals are required to properly operate the devices. To illustrate features of the invention, a television 58 is shown in simplified form in FIG. 3 resting on the support surface 56 of the shelf 52. The television has a power cord 60 and a cable signal cord 62 extending therefrom as is known.

Figure 4:
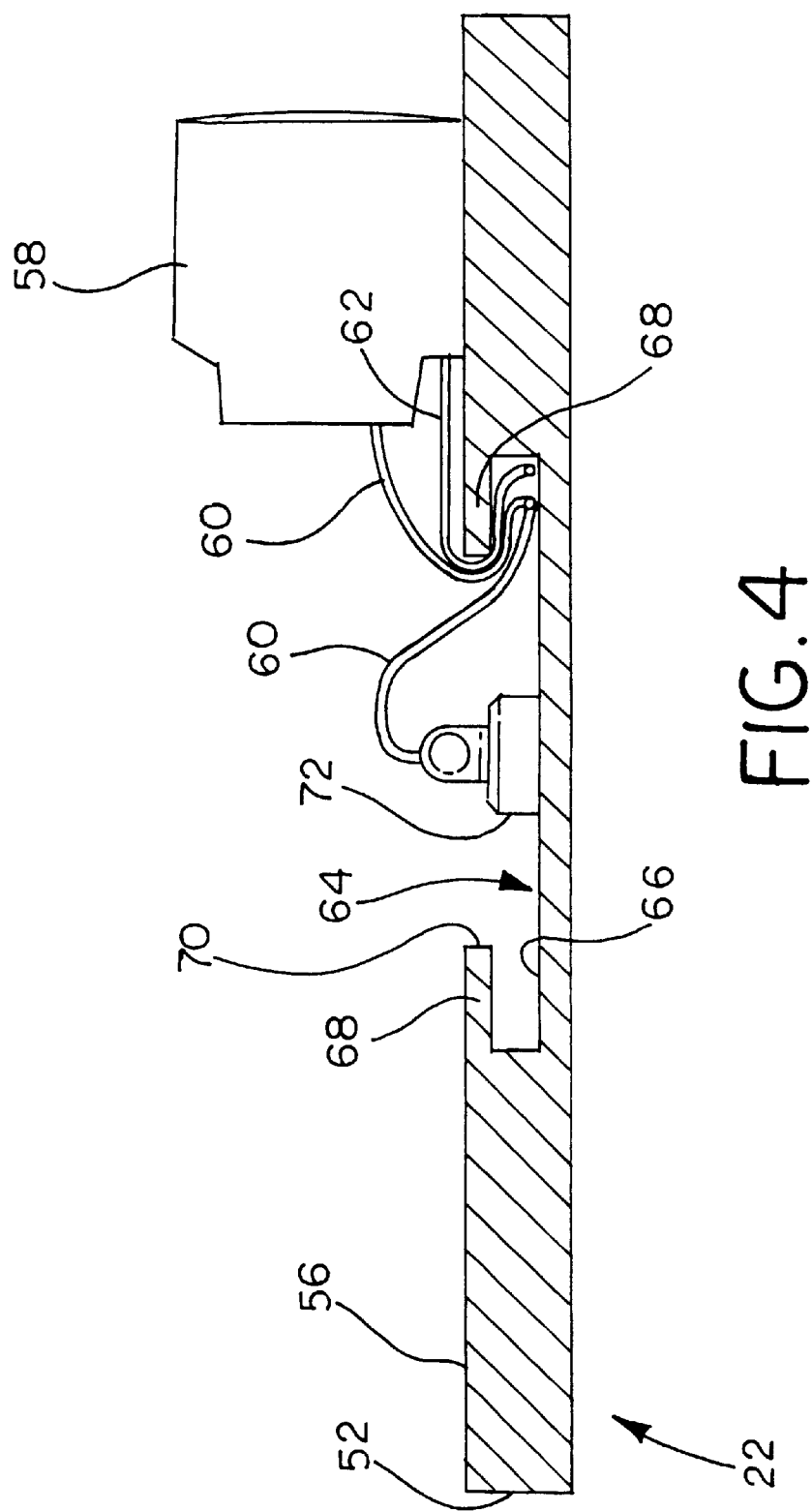
FIG. 4 is a cross section taken along line IV—IV of the fixture display shelf shown in FIG. 3.

The disclosed shelf 52 of the system 20 has a trough 64 that is recessed into and relative to the support surface 58. The trough 64 in this example extends over a substantial portion of the shelf length. As shown in FIG. 4, the trough 64 has a bottom surface 66 positioned below the support surface 56 and has a pair of overhanging ledges 68 arranged such that the bottom surface 66 is wider than a trough opening 70 of the trough. A power connection strip 72 is positioned within the trough 64. The strip 72 can be a conventional strip simply placed in the trough and resting on the bottom surface 66 or can be a fixed, integral strip formed as part of the shelf 52. In either case, the strip 72 provides a plurality of power connection outlets 74 for connection with power cords of products supported by the shelf 52 such as the power cord 60 of the television 58. The trough 64 and overhanging ledges 68 assist in neatly routing and hiding the various cords and cables of the products on the shelf 52 as shown in FIG. 4.

Figure 3:
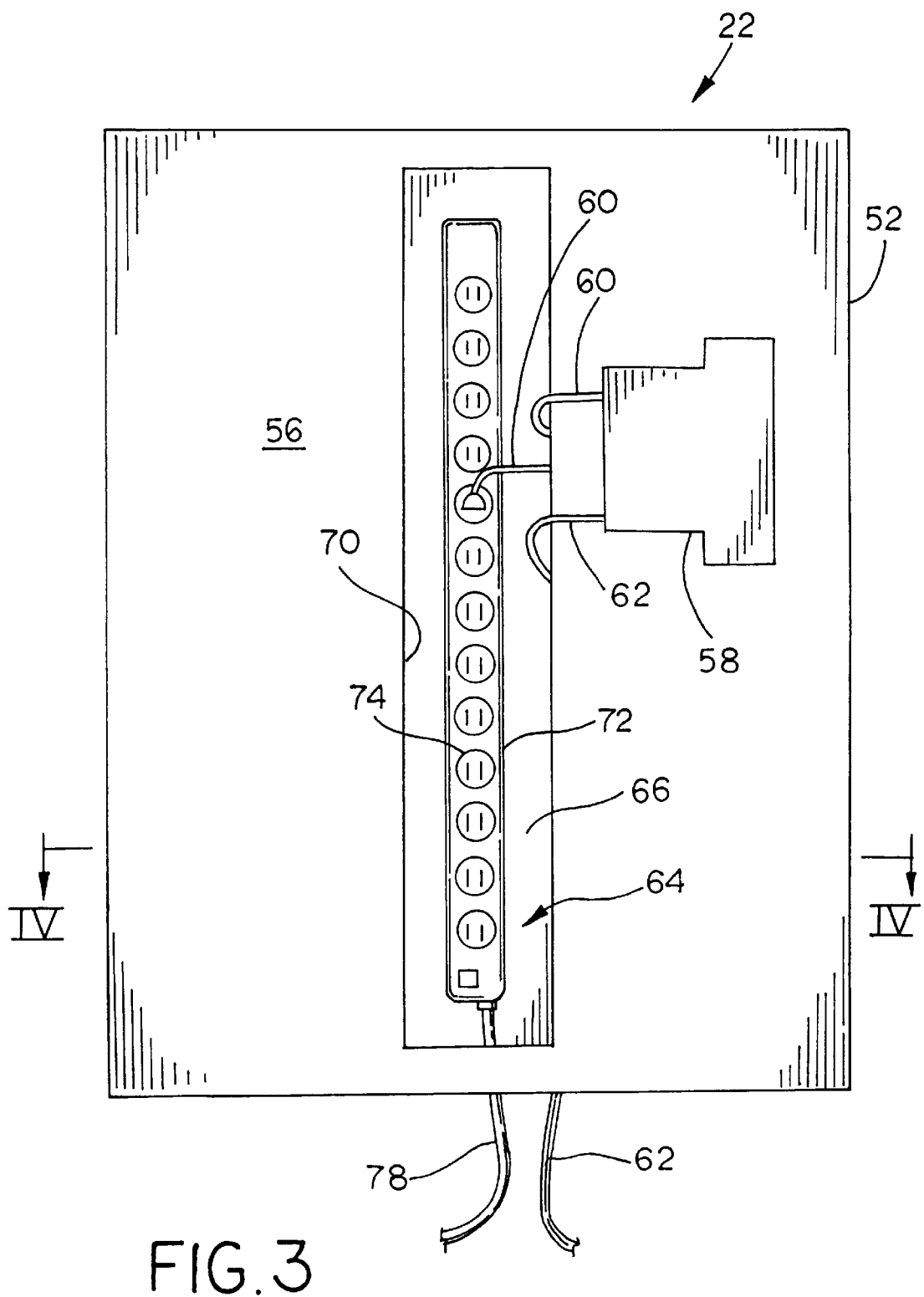
FIG. 3 is a top plan view of the fixture display shelf shown in FIG. 1.
Figure 5:
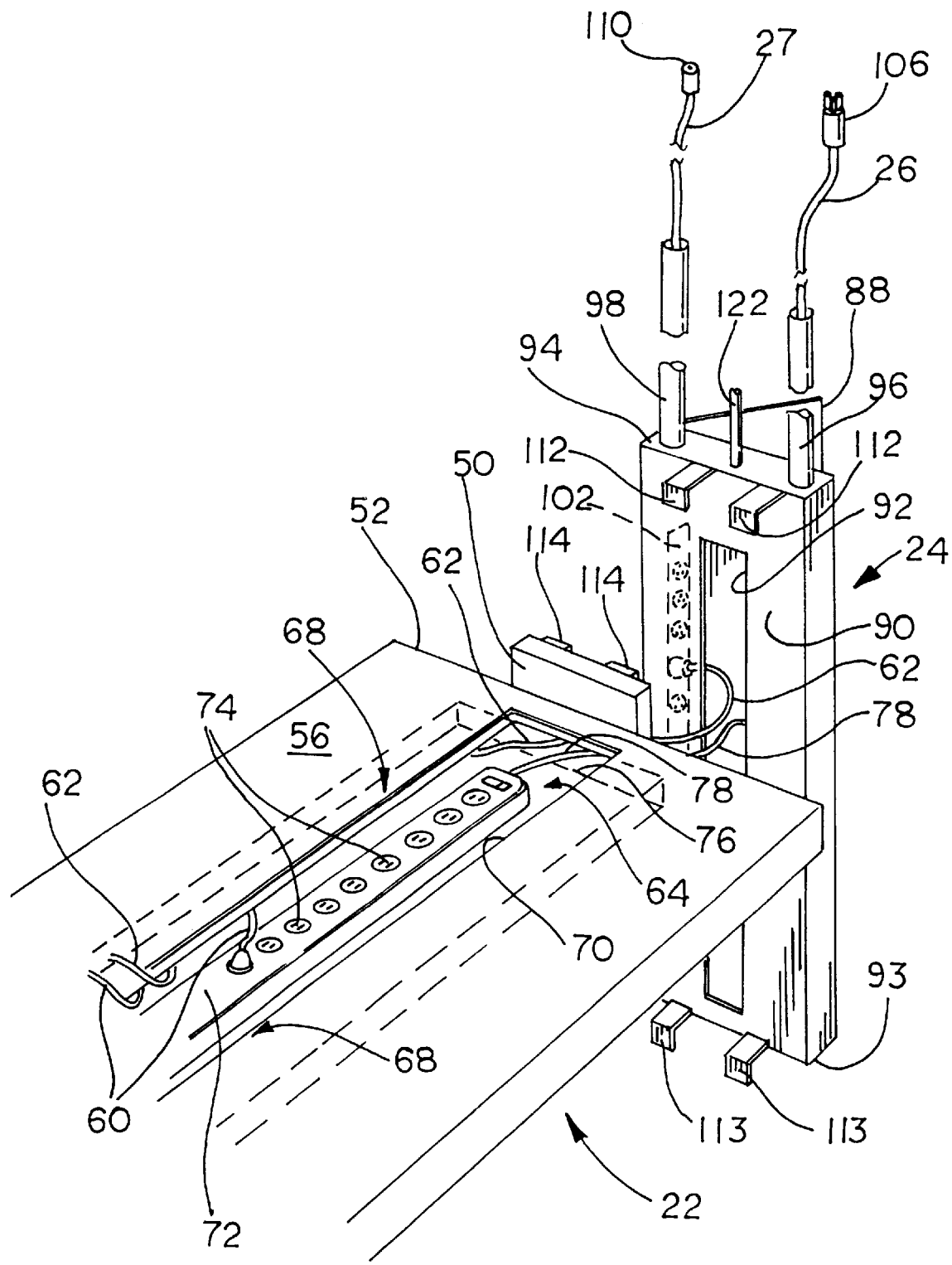
FIG. 5 is a perspective view of the fixture display shelf shown in FIGS. 1, 3 and 4 and further illustrating a back view of a fixture riser shown in FIG. 1 and the general wiring connection between the riser and shelf.

In this example, the signal cords such as the cable television signal cord 62 are routed directly from the products into the trough and tucked beneath the overhanging ledges, including any cord excess length. The power cords such as the television cord 60 are first plugged into the strip 72 with the excess cord tucked beneath the overhanging ledges 68. Each of the cords and cables is then routed through a bottom opening 76 in one end of the trough of the shelf 52. One or both ends of the shelf 52 can be provided with such a bottom opening, as needed for a particular system. As shown in FIGS. 3 and 5, the distal end of each signal cord in the disclosed example extends from the shelf 52 through the selected bottom opening 76 for connection with the riser 24 as described below. A single strip cord 78 also extends from one end of the power strip 72 through the selected bottom opening 76 for connection with the riser 24 as described below.

The fixtures 22 can be designed as modular units where the frames 50 and shelves 52 can be arranged in various configurations and constructions according to a particular store display design. The shape, size, and orientation of the shelves 52 can also vary from the disclosed rectangular shelf 52. Further, the trough 64 can be formed along any edge of the shelf 52 with only a singe overhanging ledge 68, instead of the disclosed center placed trough. For some applications, a shelf may be provided with no such trough and yet be useable with other components of the system 20. In further applications, the shelves and frame can be provided as a single integral unit or each shelf can be provided with an integral frame portion in a stackable configuration.

Figure 6:
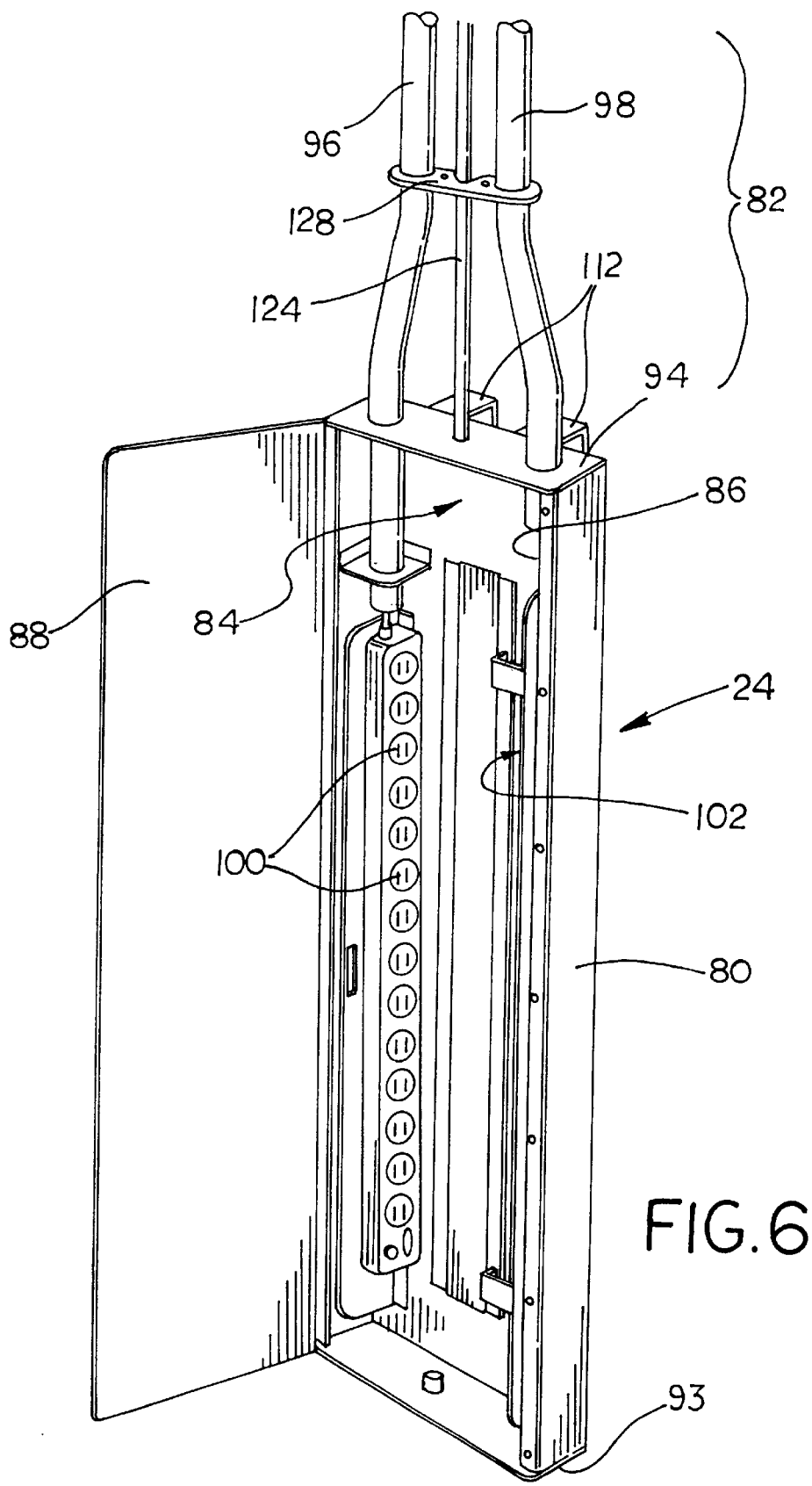
FIG. 6 is a perspective front view of the fixture riser shown in FIGS. 1 and 5 and with the front cover removed.

Referring now to FIGS. 5 and 6, the power distribution riser 24 has a lower box section 80 and an upper conduit section 82 extending upward from the box section. The lower box section 80 has an interior 84, a front opening 86, an openable front cover 88, a back side 90, a back opening 92, a bottom end 93, and a top end 94. The conduit section 82 has at least a pair of conduits 96 and 98 fixed to and extending upward from the top end 94 of the box section 80. Each conduit is for receiving wires and/or cables from the box section 80 and for supporting and guiding the respective wires or cables upward as described below.

A plurality of electrical power plug receptacles 100 are housed within the interior 84 on one side of the box section. A plurality of signal plug receptacles 102 are housed within the interior 84 on an opposite side of the box section. The power plug receptacles 100 are electrically coupled to the power cable 26 that extends from the box section 80 into and through the conduit 96. A free end of the power cable 26 extends well beyond the top end of the conduit 96 and terminates at a power plug connectors 106. The signal plug receptacles 102 are coupled to one or more signal cables 27, as needed, that extend into and through the conduit 98. The free ends of the signal cables 27 also extend well beyond the top end of the conduit 98 and terminate at appropriate signal plug connectors 110.

In one example, the power cable 26 and signal cables 27 extend about six feet beyond the respective conduit top end. A number of electrical standards (such as the Underwriters Laboratories) do not permit more that 6 feet of unprotected cable within a store environment or the like. As discussed above, the 8 foot centered junction boxes 34 of the distribution grid 30 will permit a fixture and riser positioned anywhere within the power grid 30 to reach and plug into a junction box without over-stressing the cables and plugs.

One or more hooks 112 can be provided on the back side 90 near the top end 94 of the box section 80. One or more hooks 113 can also be provided on the back side 90 near the bottom end 93. The hooks 112 and 113 can be received in corresponding slots or openings 114 provided either in one of the shelves 52 or in part of the frame 50 of the fixture 22. The hooks and slots permit attachment and removal of the risers 24 from the fixtures 22 without the need for fasteners. This construction makes installation and removal of the risers 24 very simple and relatively fast. The lower hooks 113 prevent each riser 24 from being swung or pivoted outward at the bottom end 93 once installed. This can prevent damage to parts of the riser 24 or dislodging of the various cables and connections.

The conduits 96 and 98 and the box section 80 can vary in size, shape, and curvature and yet fall within the scope of the invention. A particular store design may require a stylized look that can be easily enhanced using specialized conduit and box designs. The box section 80 and conduit section 82 can also be fabricated from virtually any material including metals, plastics, and the like. Similarly, the shelves 52 and frame 50 can also be fabricated from virtually any suitable material including metals, plastics, wood, or the like, as long as the material and structural design is adequate perform as intended.

Figure 7:
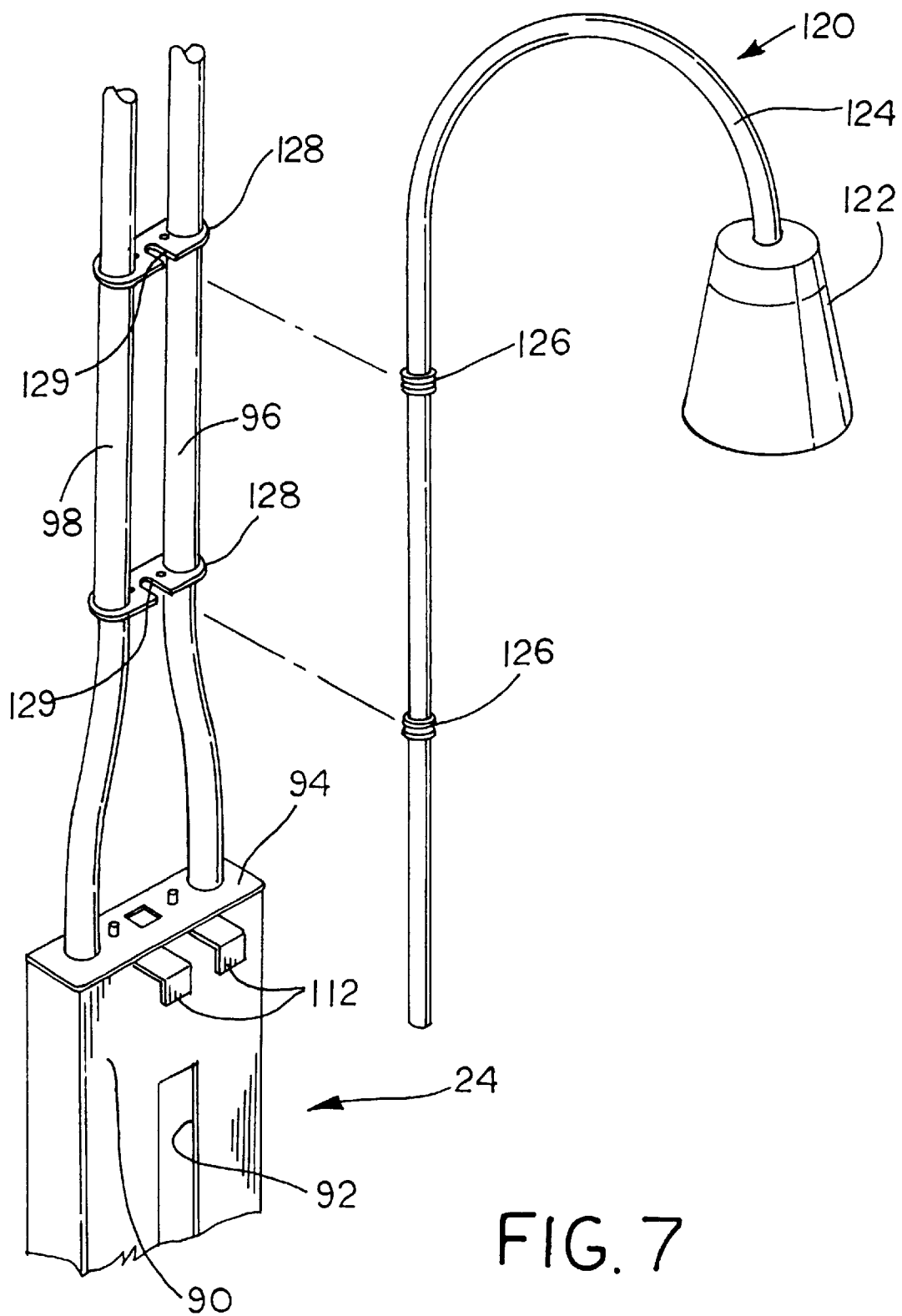
FIG. 7 is a perspective, partially exploded front view of the fixture riser shown in FIGS. 5 and 6 and further illustrating a fixture display lamp.

FIG. 7 illustrates one of many options that can be included as part of the riser or other part of the system. A lamp 120 extends from the top end 94 of the box section 80. The lamp 120 has a shade 122 affixed to a distal end of a lamp conduit 124. The proximal end of the conduit 124 is coupled to the top end 94. In one example, the proximal conduit end is removably coupled to the top end 94 such that the lamp is electrically energized upon attachment of the lamp 120 to the box section 80. Alternatively, the lamp 120 can be provided as a permanent attachment to the distribution riser 24 or can snap into place on the top end 94 and plug directly into one of the receptacles 100. As will be evident to those of ordinary skill in the art, the lamp 120 can vary considerably in design, style, illumination properties and the like without departing from thee scope of the invention.

The disclosed lamp 120 is held in place by a pair of grommets 126 received over the conduit 124. A pair of clips 128 are secured to the conduits 96 and 98 which hold the conduits in a predetermined spacing. A slot 129 is positioned between each conduit 96 and 98 in the clips 128. Each grommet 126 is received in a respective one of the clip slots 129 to hold the lamp 120 in place.

Figure 8:
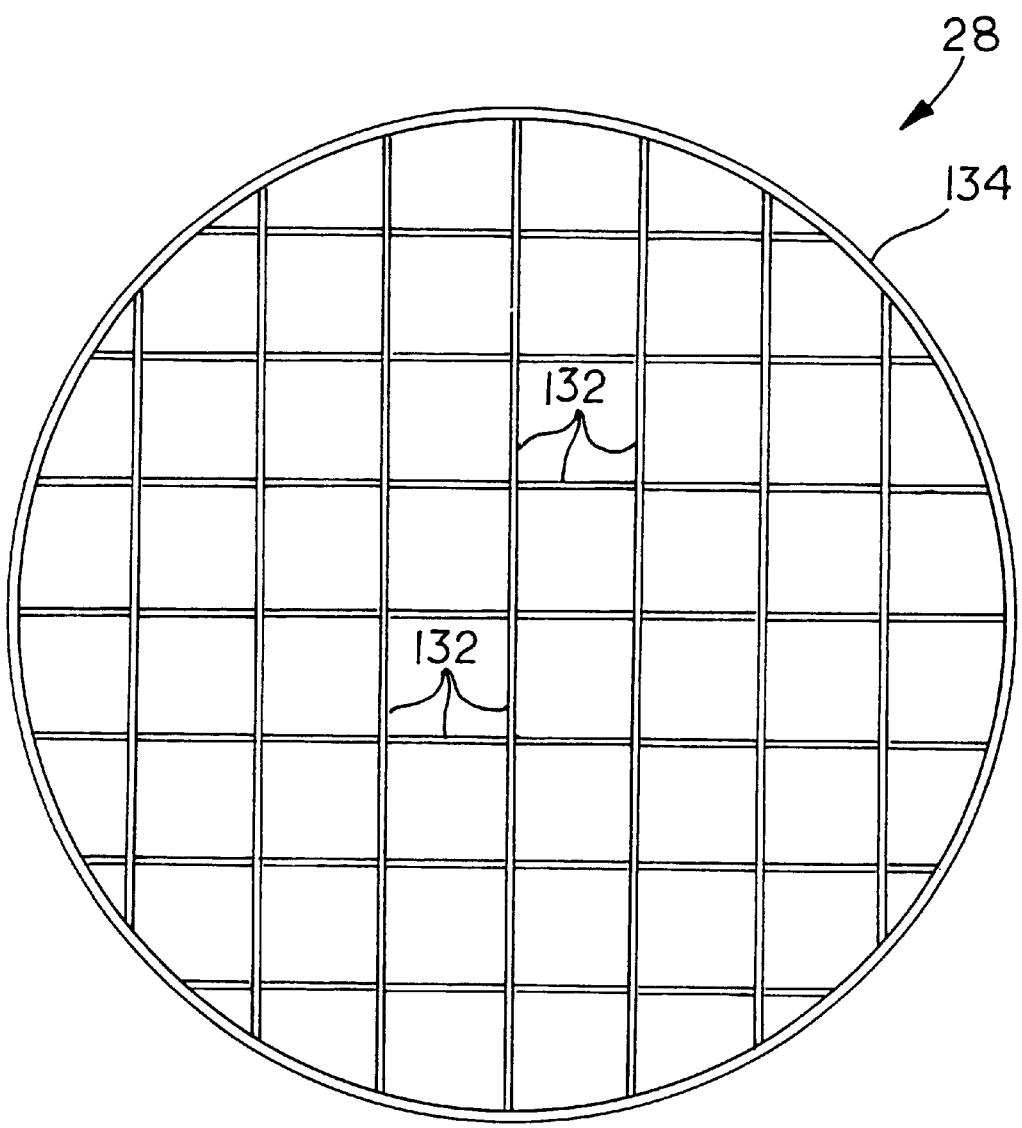
FIG. 8 is a plan view of a grid mask and wire support of the system as shown in FIG. 1.
Figure 9:
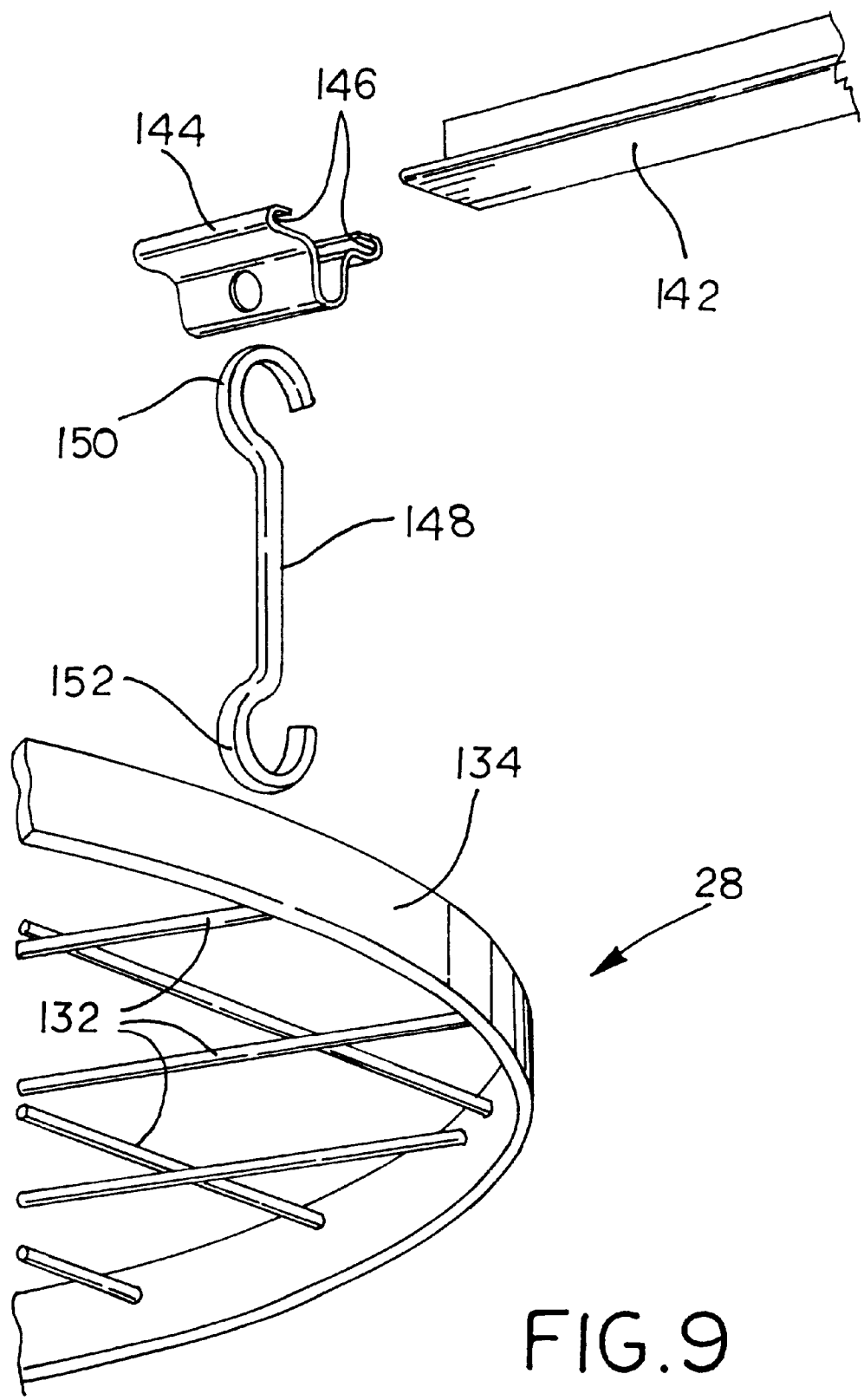
FIG. 9 is a perspective exploded view of the grid mask and wire support shown in FIG. 8 and further illustrating the installation hardware.

FIGS. 1, 8, and 9 illustrate one possible example of the mask and support grids 28 for the excess and exposed signal and power cables 26 and 27 extending between the top ends of the riser conduits 96 and 98 and the power grid junction boxes 34. The disclosed mask and support grids 28 each a wire mesh grid 132 and a perimeter rim 134 supporting the mesh grid. The mask and support grid is intended to mask or hide the existence of excess cables 26 and 27 extending from the riser conduits. The mask and support grids 28 are also intended to support the weight of the excess cable 26 and 27 to prevent damage or disconnection of the power plug connectors 106 and signal plug connectors 110 from the junction box 34. The disclosed perimeter rim 134 is circular and the mesh grid 132 is a simple square check pattern. Other shapes and patterns from that disclosed herein are possible that can perform the masking and supporting functions. The perimeter rim and mesh grid can vary in size, style and design and yet perform these intended functions.

As shown in FIGS. 1 and 9, the mask and support grids 28 are each suspended from the store ceiling 32. In this example, the ceiling 32 is a suspended tile ceiling having a plurality of acoustical tiles 140 supported by a framework with a plurality of frame elements 142. A plurality of spring clips 144 are provided having inwardly curved opposed jaws 146 adapted to snap over a frame element 142 of the ceiling 32. One end 150 of a hook 148 is received in an opening 152 in each clip 144. An opposite end 154 of each hook 148 loops under the perimeter rim 134 of the mask and support grid 28 to support and suspend the grid in a desired position.

The hooks 148 and/or clips 144 can be designed having a predetermined height or length to suspend the mask and support grid at a particular height above the store floor 36. Depending upon the shape or style of the mask and support grid 28, the diameter, length, and/or width of the grid can vary to match a particular power distribution grid 30. It is desirable that the mask and support grids 28 be capable of supporting and of hiding or masking the cables 26 and 27 and the junction boxes 34 no matter the position of the fixtures 22 within the store environment. For example, with a junction boxes 34 spaced about eight feet apart for the distribution grid 30, four foot diameter circular mask and support grids 28 can be effective for both the masking and supporting functions.

In use, the system 20 is usable in a number of ways. First, the system can be provided as a specifically designed entirely modular system for a particular store. Each fixture 22, riser 24, and mask and support grid 28, as well as the power distribution grid 30, can designed for and installed in the particular store. Second, the system can be provided as completely separate modular components available on an as needed basis. Third, the system can be provided as a kit for stores with a pre-installed power distribution grid 30. The kit can include modular fixtures 22 available with various features such as shelf size and design options, frame size and design options, color options, fixed or wheeled versions, material options, and the like. The kit can also include modular risers 24 available with various features including lamp options, riser box size, design, and color options, power and signal receptacle options, conduit shape and contour options, material options, and the like. The mask and support grids 28 can also be provided with various size, color, and style or design options. The mounting hardware for the grids 28 such as the clips 144 and hooks 148 can also be provided in various designs, sizes, colors, bracket configurations, and the like.

In use, the system 20 is versatile, flexible, and is easy to install, uninstall, and change. Each time the system 20 is set up, the fixtures 22 are simply put in place on the store floor 36 and the shelves 52 assembled or hung appropriately. The risers 24 are hung from the fixtures 22 utilizing the hooks 112 without the need for fasteners. The power and signal cables 26 and 27 and plug connectors 106 and 110, respectively, of each riser 24 are plugged into the corresponding power receptacles 44 and 46 of the nearest available junction box 34.

Products to be displayed are placed on the shelves as desired. The products are plugged into the shelf power receptacles or outlets 74 and the shelf power cords are each plugged into the riser power receptacles 100. The product signal cables, where necessary (such as the cable cord 62), are plugged directly into the riser signal receptacles 102. The excess product power and signal cables are routed and hidden in the shelf troughs 64 beneath the overhanging ledges 68.

The mask and support grids 28 are suspended from the ceiling 32 utilizing the appropriate hardware, such as the clips 144 and hooks 148. The excess cables 26 and 27 are appropriately routed and rested as necessary on the support mesh 132 of the grids 28. To rearrange or changeover the store display, the system is easily uninstalled in the same manner. The fixtures can be replaced or moved and then the system 20 can be reinstalled again to accommodate the new in-store arrangement and/or the new products.

Although certain methods and distribution systems and modifications have been disclosed and described herein in accordance with the teachings of the present invention, the scope of coverage of this patent is not limited thereto. On the contrary, this patent covers all embodiments of the teachings of the invention fairly falling within the scope of the appended claims, either literally or under the doctrine of equivalents.

What is claimed is:

1. A modular power distribution system for product display within a store, the distribution system comprising:
   a plurality of product display fixtures each defining at least one product display surface;
   an electrical distribution grid provided above a plurality of display fixtures within the store, the electrical distribution grid having a plurality of spaced apart junction boxes each linked at least to a power source;
   a riser removably coupled to part of the fixture, the riser having a lower box section with at least one power receptacle and having an upper conduit section with a power cable extending from the conduit section, the power cable having a power plug adapted for electrical connection with a selected one of the junction boxes and for electrically coupling the at least one power receptacle to the distribution grid.

2. A system according to claim 1, wherein the upper section of the riser further comprises:
   a first conduit having a power cable passing through and extending from a distal end of the first conduit; and
   a second conduit having at least one signal cable electrically coupled to a corresponding signal receptacle of the lower section, the signal cable passing through and extending from a distal end of the second conduit.

3. A system according to claim 1, wherein the lower section of the riser further comprises:
   at least one signal receptacle; and
   at least one signal cable extending from the conduit section and having a signal plug adapted for signal connection with a selected one of the junction boxes and for coupling the at least one signal receptacle to the distribution grid.

4. A system according to claim 1, wherein the electrical distribution grid is also coupled to at least one signal source.

5. A system according to claim 1, wherein the electrical distribution grid is provided in a ceiling of the store.

6. A system according to claim 1, further comprising:
   a plurality of signal sources coupled to the electrical distribution grid;
   a plurality of signal receptacles provided in the lower section of the riser; and
   a plurality of signal cables extending from the conduit section each having a corresponding signal plug adapted for signal connection with a selected one of the junction boxes and for coupling the respective signal receptacles to the electrical distribution grid.

7. A system according to claim 1, wherein each product display fixture further comprises:
   at least one shelf defining a product display surface;
   a recessed trough in the product display surface; and
   a plurality of power receptacles arranged in the trough, the plurality of power receptacles each electrically coupled with the at least one power receptacle in the lower section of the riser.

8. A system according to claim 7, wherein each of the product display fixtures includes a plurality of the shelves and wherein each of the risers includes a plurality of the power receptacles.

9. A system according to claim 1, wherein each of the product display fixtures further comprises:
   a frame;
   a plurality of shelves supported by the frame, each of the shelves defining a product display surface; and
   wheels supporting the frame.

10. A system according to claim 1, wherein each riser further comprises a lamp extending from a top end of the riser.

11. A system according to claim 1, further comprising:
    at least one mask and support grid suspended from a ceiling of the store, the mask and support grid having a mesh grid positioned and arranged to support excess length of cable extending between the junction box and the upper section of the riser.

12. A system according to claim 11, wherein each mask and support grid is suspended by a hook attached to a clip connected to a portion of the store ceiling.

13. A system according to claim 1, wherein the riser further comprises:
    a back side; and
    at least one hook extending from the back side and adapted to removably attached the riser to a part of the product display fixture.

14. A system according to claim 13, further comprising:
    at least one hook extending from the back side near a top end of the riser and at least one hook extending from the back side near a bottom end of the riser.

15. A product display fixture for a store, the display fixture comprising:
    at least one display surface having a trough recessed into a portion of the display surface, a plurality of power receptacles disposed within the trough, a power cable electrically coupled to each of the receptacles, and a plug connector at a distal end of the cable extending from the shelf; and
    a riser removably coupled to part of the fixture, the riser having a lower section with at least one power receptacle for receiving the plug connector of the shelf and having an upper section with a riser plug connector at a distal end of an upwardly extending riser power cable, wherein the riser plug connector is adapted for electrical connection with a junction box of a power supply.

16. A product display fixture according to claim 15, wherein the trough is positioned near a center axis of a shelf and wherein the shelf defines a product display surface on both sides of the trough.

17. A product display fixture according to claim 15, wherein the trough has opposed ends and a bottom opening near at least one of the opposed ends and wherein the power cable passes from the trough through the bottom opening.

18. A product display fixture according to claim 15, further comprising:
    a plurality of shelves each defining one of the at least one product display surfaces.

19. A product display fixture according to claim 15, wherein the riser includes a lower section with a back side and a back opening in the back side and wherein the power plug connector is received through the back opening and plugged into the at least one power receptacle.

20. A product display fixture according to claim 19, wherein the riser further comprises:
at least one hook extending from the back side, the hook removably attached to a portion of a frame of the product display fixture.

21. A product display fixture according to claim 15, wherein the upper section of the riser further comprises:
a first conduit through which the riser power cable passes and having a distal end from which a portion of the riser power cable and the riser plug connector extend; and
a second conduit having at least one signal cable electrically coupled to a corresponding signal receptacle of the lower section, the at least one signal cable passing through and extending from a distal end of the second conduit.

22. A product display fixture according to claim 15, wherein the riser has a front opening and a removable front cover over the front opening.

23. A riser for a power distribution system for product display fixtures in a store, the riser comprising:
a lower box section having an interior and a top end;
at least one power receptacle within the interior for electrically coupling the power distribution riser with the product display fixture;
at least one conduit extending upward from the top end;
at least one power cable electrically coupled to the at least one receptacle and extending upward through and beyond a distal end of the conduit;
a power plug connector on a distal end of the cord for connecting the power distribution riser to an external power supply; and
a mounting mechanism for releasably mounting the power distribution riser on a product display fixture.

24. A riser according to claim 23, further comprising a plurality of the power receptacles in the interior of the lower box section.

25. A riser according to claim 23, further comprising:
a second conduit; and
at least one signal cable passing through and extending from a distal end of the second conduit and electrically coupled to a corresponding signal receptacle within the interior of the lower box section.

26. A riser according to claim 25, further comprising:
a plurality of the signal cables and a corresponding plurality of the signal receptacles.

27. A riser according to claim 23, further comprising:
a front opening in the lower box section;
an openable front cover over the front opening; and
a back side of the lower box section having a back opening.

28. A riser according to claim 23, further comprising:
a lamp coupled to a top end of the lower box section.

29. A riser according to claim 23, wherein the mounting mechanism further comprises:
a pair of hooks extending from a back side of the lower box section near a top end.

30. A riser according to claim 29, wherein the mounting mechanism further comprises:
a pair of hooks extending from the back side of the lower box section near a bottom end.

31. A method for distributing power and other signals to product displays within a store, the method comprising the steps of:
arranging an electrical distribution grid including a plurality of spaced apart junction boxes near a ceiling of the store;
coupling each junction box to a power supply of the store;
placing a plurality of display fixtures within the store wherein each fixture defines at least one display surface;
mounting a riser to a portion of each of the plurality of display fixtures, each riser having at least one power receptacle, at least one conduit, at least one power cord passing through and extending from the at least one conduit, and a power plug connector on the distal end of the at least one power cord;
placing product on the display surfaces;
electrically coupling the product to the at least one receptacle of the distribution riser; and
connecting the power plug connector of the power cord to a selected one of the junction boxes.

32. A method according to claim 31, further comprising the steps of:
positioning a cable mask and support grid near the selected one junction box and between the power distribution grid and the riser; and
routing any excess length of the at least one power cord to rest at least partially on the mask and support grid.

33. A method according to claim 31, further comprising the steps of:
further coupling signal plug connectors of the product to corresponding signal receptacles of each riser; and
further connecting signal plug connectors of signal cables coupled with the signal receptacles into corresponding signal receptacles of the selected one junction box for each riser.

34. A method according to claim 31, wherein the step of electrically coupling further comprises:
coupling the product to power receptacles of the product display surface; and
coupling a power cable of the product display surface to the at least one power receptacle of the riser.

35. A distribution kit for display fixtures in a store having an electrical distribution grid in a ceiling of a store, the distribution kit comprising:
a riser adapted for attachment to a product display fixture of the store, the riser having at least one power receptacle, at least one upwardly extending conduit, and at least one power cable passing through and extending from a distal end of the conduit;
a mounting mechanism for removably attaching the riser to the product display fixture; and
a mask and support grid for mounting to the store ceiling near the distal end of the at least one conduit, the mask and support grid having a support surface for supporting an excess portion of the power cable extending between the store distribution grid and the distal end of the at least one conduit.

36. A distribution kit according to claim 35, wherein the mask and support grid includes a circular perimeter frame and a mesh grid supported within the perimeter frame and wherein the mesh grid defines the support surface.

37. A distribution kit according to claim 35, further comprising:
at least one product display shelf for mounting to the product display fixture, the shelf defining a product display surface and having a trough recessed in the product display surface, the trough having a plurality of power plug receptacles therein.

38. A distribution kit according to claim 35, further comprising:
- a lamp removably attached to the riser.

39. A distribution kit according to claim 35, wherein the riser further comprises:
- a second upwardly extending conduit;
- at least one signal receptacle;
- at least one signal cable coupled with the signal receptacle and passing through and extending from the second conduit; and
- at least one signal plug connector at a distal end of the signal cable.

40. A distribution kit according to claim 35, wherein the mounting mechanism includes at least one hook extending from the riser for attachment to a portion of a product display fixture.

41. A distribution kit according to claim 40, wherein the mounting mechanism further includes at least one hook extending from a back side near a top end of the riser and at least one hook extending from the back side near a bottom end of the riser.

* * * * *